United States Patent [19]
Wood

[11] Patent Number: 5,461,776
[45] Date of Patent: Oct. 31, 1995

[54] METHOD OF MANUFACTURING PISTON RINGS

[75] Inventor: Graham R. Wood, Tisbury, England

[73] Assignee: AE Piston Products Limited, Bradford, England

[21] Appl. No.: 308,962

[22] Filed: Sep. 20, 1994

Related U.S. Application Data

[63] Continuation of Ser. No. 65,444, May 24, 1993, abandoned, which is a continuation of Ser. No. 630,549, Dec. 20, 1990, abandoned.

[30] Foreign Application Priority Data

Jan. 9, 1990 [JP] Japan .................................... 2-9000446

[51] Int. Cl.⁶ .................................................. B23P 15/00
[52] U.S. Cl. ................ 29/888.072; 29/888.074; 29/888.076
[58] Field of Search ..................... 29/888.072, 888.074, 29/888.076, 527.2, 412.–417; 427/34

[56] References Cited

U.S. PATENT DOCUMENTS

| | | | |
|---|---|---|---|
| 1,329,271 | 1/1920 | Hartog | 29/888.072 |
| 1,951,397 | 3/1934 | Covert | 29/888.072 |
| 2,033,093 | 3/1936 | Covert | 29/888.072 |
| 2,119,035 | 5/1938 | Ballard | 29/888.074 |
| 2,287,884 | 6/1942 | Jominy | 29/888.074 |
| 2,367,159 | 1/1945 | Van Der Horst | 29/888.074 |
| 3,421,198 | 1/1969 | Prasse . | |
| 4,085,490 | 4/1978 | McCormick . | |
| 4,176,434 | 12/1979 | Cromwell et al. | 29/888.074 |
| 4,651,395 | 3/1987 | Tanner . | |

FOREIGN PATENT DOCUMENTS

| | | |
|---|---|---|
| 1775854 | 9/1971 | Germany . |
| 135249 | 11/1919 | United Kingdom . |
| 401421 | 11/1933 | United Kingdom . |
| 416622 | 9/1934 | United Kingdom . |
| 498691 | 1/1939 | United Kingdom . |
| 566797 | 1/1945 | United Kingdom . |
| 1193584 | 6/1970 | United Kingdom . |
| 2022768 | 12/1979 | United Kingdom . |

OTHER PUBLICATIONS

"New Development in Piston Rings For The Modern Diesel Engine" McCormick, et al, 1975 SAE Off–Highway Vehicle Mtg. Sep. 8–11, 1975.

*Primary Examiner*—Irene Cuda
*Attorney, Agent, or Firm*—William R. Hinds

[57] ABSTRACT

A method for the manufacture of piston rings, includes the steps of producing a tube and machining the desired ring free shapes on the inner and outer diameters of the tube providing desired cross sectional profiles by grinding, for example, and then cutting the individual rings from the tube. The ring gaps are preferably formed after cutting the ring from the tube. Coatings on the ring outer surface may be applied and shaped while in tube form.

18 Claims, 2 Drawing Sheets

METHOD OF MANUFACTURING PISTON RINGS

This is a continuation of application Ser. No. 08/065,444 filed May 24, 1993, now abandoned, which is a continuation of application Ser. No. 07/630,549 filed Dec. 20, 1990, now abandoned.

The present invention relates to a method for the manufacture of piston rings.

It is known to produce piston rings from cast material, usually cast iron, by two distinct methods. The first method comprises casting a "tree" having individual piston ring blanks attached to a central casting gate. The second method comprises casting a tube, usually by a centrifugal casting technique, and slicing the tube into individual pieces from which piston rings are produced. Both these methods have the disadvantage that for many of the production operations the pieces are being handled individually whilst for other operations they must be brought together in a stack involving a large number of handling operations. The handling operations virtually all require dedicated tooling for virtually each part number produced, whilst the handling operations themselves lead to damage and increased scrap. Other disadvantages include large numbers of machines to perform the operations, large numbers of people to set and operate the machines, high levels of work in progress and large factory areas to house the machines and work in progress. These disadvantages consequently lead to less flexibility of manufacture and slower response time to changes in customer requirements.

It is an object of the present invention to overcome or reduce some of the above disadvantages.

Generally according to the following disclosure, a method for the production of piston rings comprises the steps of producing a tube of the material from which the rings are to be made, machining desired ring free shapes on the inner and outer diameters of the tube and cutting each individual ring from the tube so machined.

Preferably ring cross sectional profile features may also be formed by, for example, grinding prior to cutting the ring from the tube.

In one embodiment of the method the tube may be made by centrifugal casting.

The ring gap may be provided in each ring either before separation from the machined tube or after separation. Preferably, however, the ring gap may be produced after the individual ring has been removed from the tube.

The method may be used to produce plain rings having no coating on the cylinder wall rubbing face, electro-plated rings having a chromium plated coat, for example, or rings having a coating produced by a physical vapour deposition (pvd) process, e.g. molybdenum by plasma spraying. Where the rings are to be coated by electro-plating or a pvd process the outer diameter of the tube may be machined to produce a series of grooves or other features corresponding to that required on each ring. The outer diameter of the tube may be plated or otherwise coated and machined by, for example, grinding, to a profile corresponding to the final desired ring surface profile. Some advantages of this method are that problems encountered with the plating step during the conventional ring manufacturing process, and which occur when gap sealing is not satisfactory, are eliminated. For example, gas emanating from gaps causes an inconsistent chromium plate deposit on adjacent rings. Furthermore, loading and tooling techniques with the present invention are easier and faster. Current transfer is improved as there are fewer interfaces involved and, therefore, less likelihood of high resistances being set up.

After proof turning the cast tube may be provided with a datum register from which all machining operations may be calculated. The register may comprise a counter bore having an internal shoulder or merely a bore having an end face of the tube as a datum face. Additionally, the tube end face may be provided with a feature to serve as a radial datum register. Such features may comprise notches in the end face or drilled holes and mating dowels etc.

A particular advantage of the process of the present invention is that the part-off operation may be carried out near the end of the operation sequence. This gives considerable improvement in productivity due to the radial wall thickness of the tube being at a minimum at this stage. A piston ring having a nominal 125 mm outer diameter when closed and a 5 mm radial width would require a tube having a wall thickness of approximately 11 mm when made by a conventional route. Thus, a wall thickness of less that 50% of that normally encountered exists at the part-off stage. This allows greater accuracy of part-off width due to the reduced thickness to be cut and minimises subsequent grinding operations. Material is also saved by allowing a narrower part-off tool/wheel width which may be translated into additional ring capacity for each machined tube length.

According to one aspect of the present invention, a method for the production of piston rings comprises the steps of producing a tube of the material from which the rings are to be made, machining predetermined noncylindrical ring free shapes on the inner and outer diameters of the tube which substantially correspond to the required unconstrained free shape of the piston ring, cutting each individual ring from the tube so machined, and, at a point in the process subsequent to the machining, removing material corresponding to the ring gaps in finished unconstrained rings.

According to the invention in another aspect, a method for the production of piston rings comprises the steps of producing a tube of the material from which the rings are to be made, the tube having a longitudinal axis associated therewith, providing at least axial and radial datum registers in first machining steps of the tube, then by at least two subsequent machining steps, each employing a CNC technique and being in relation to the datum registers, providing substantially desired ring free shapes on the inner and outer surfaces of the tube, and then separating each at least substantially formed ring from the tube.

In the method of the previous paragraph, the first machining steps may include providing two datum registers comprising either an end face of the tube and a bore, or a bore having an internal shoulder, and providing a machined datum feature on the tube end face for location and reference.

Also in accordance with the invention, a method for the production of piston rings includes producing a tube of the material from which the rings are to be made, and machining the outer surface and the bore of the tube to desired ring profiles wherein in first machining steps of the tube there are provided at least two datum registers comprising either an end face of the tube and a bore, or a bore having an internal shoulder, and a machined datum feature is provided on the tube end face for location and reference, all subsequent machining operations on the tube are calculated from these datum registers and datum feature and include machining the outer surface and the bore of the tube to desired profiles which substantially correspond to the required unconstrained free-shape of the rings, then providing ring cross-sectional profile features, and partially completed rings subsequently are separated from the tube.

In order that the present invention may be more fully understood an example will now be described by way of illustration only with reference to the accompanying drawings, of which:

Figure 1A:
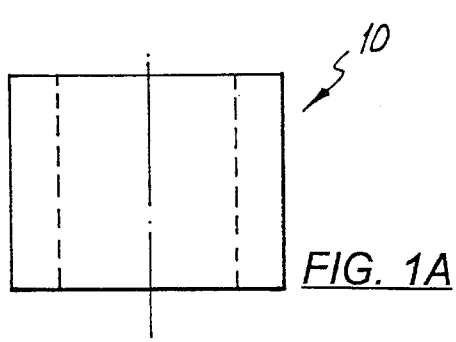
FIGS. 1A and 1B show an axial and radial section through a centrifugally cast cast iron tube.
Figure 1B:
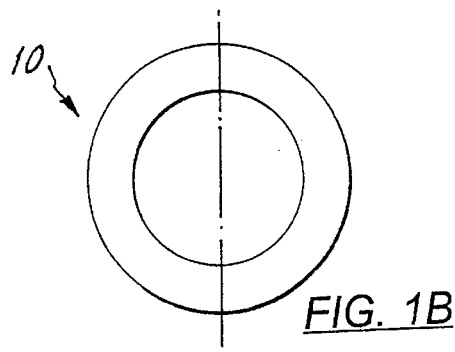
Figure 2A:
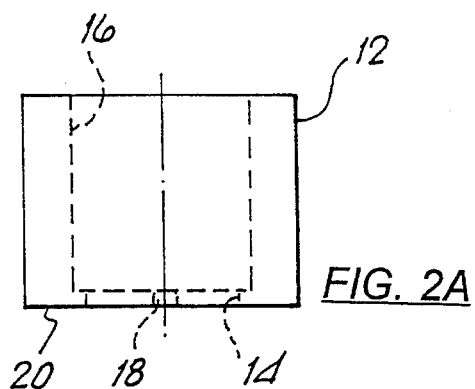
FIGS. 2A and 2B show the tube of FIG. 1 having a register bore and radial location notch machined therein.
Figure 2B:
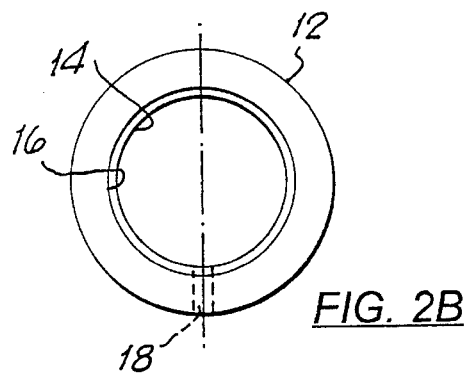
Figure 3A:
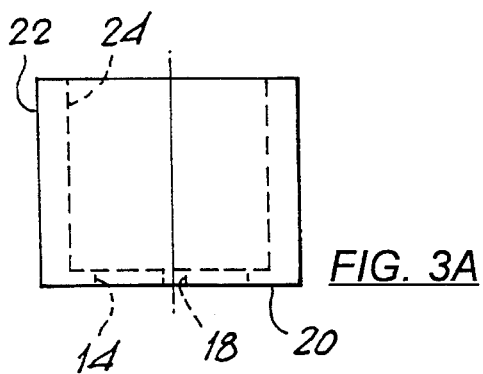
FIGS. 3A and 3B show the tube of FIG. 2 having the basic O.D. and bore machined.
Figure 3B:
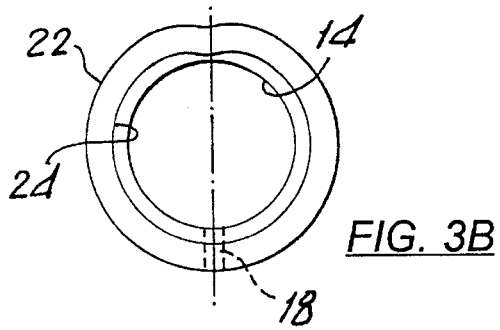
Figure 4A:
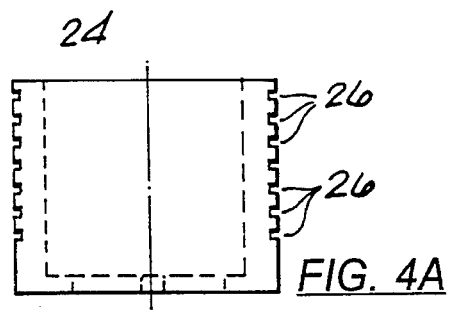
FIGS. 4A and 4B show the tube of FIG. 3 having a required profile machined on to the O.D. prior to chromium plating.
Figure 4B:
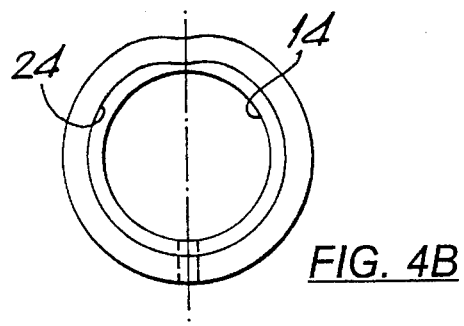
Figure 5A:
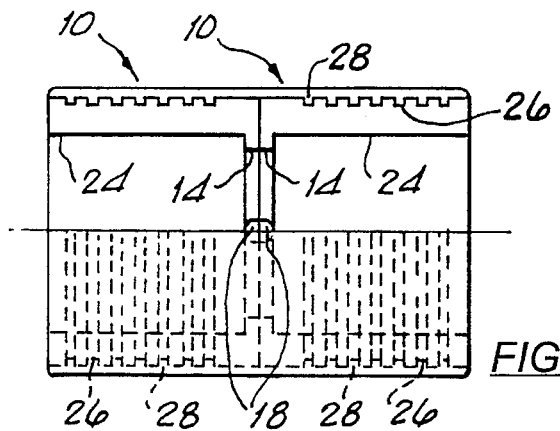
FIGS. 5A and 5B show two tubes joined together and having been chromium plated.
Figure 5B:
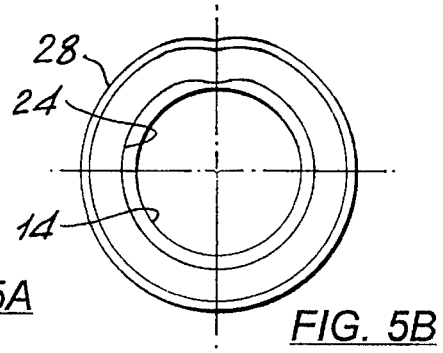
Figure 6:
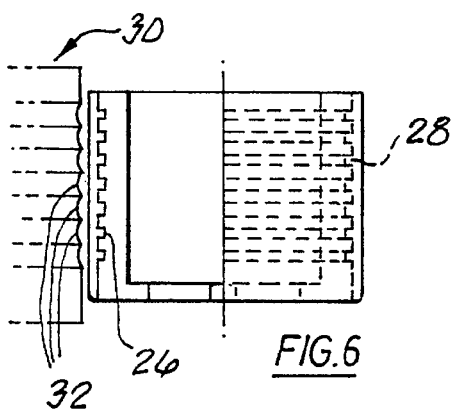
FIG. 6 shows a chromium plated tube being profile ground.
Figure 7:
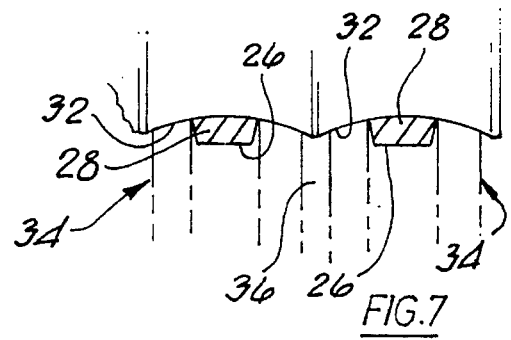
FIG. 7 shows a detail of FIG. 6 showing two adjacent ring surface profiles.
Figure 8:
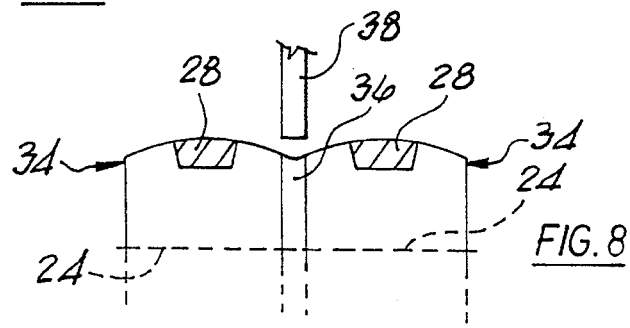
FIG. 8 shows the ground tube of FIGS. 6 and 7 being split into individual rings.
Figure 9:
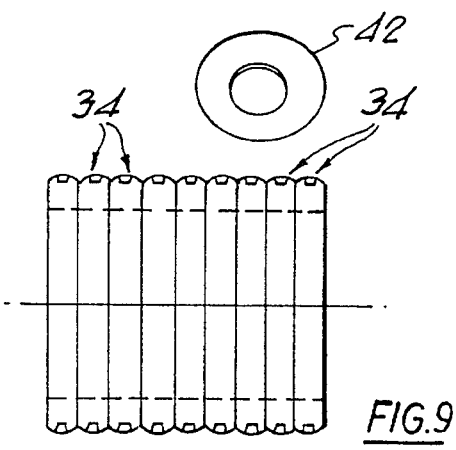
FIG. 9 shows the ring gaps being produced in a stack.
Figure 10:
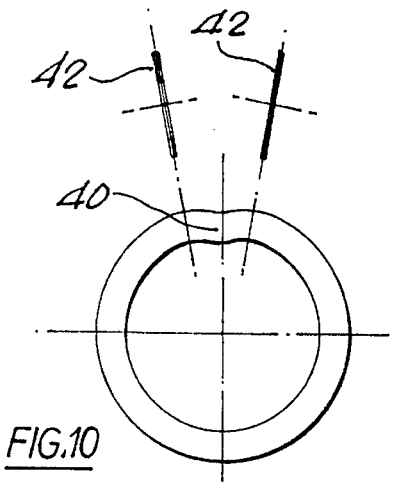
FIG. 10 shows an end view of the rings of FIG. 9 with the gap being produced.

Referring now to the drawings and where the same features are shown by common reference numerals. A centrifugally cast cast iron tube is shown at 10 (FIGS. 1A and 1B). The tube is then proof turned on the outer surface 12, provided with a datum register bore 14 by turning and proof bored 16. A milled notch 18 is provided for radial location and reference. The end face 20 is machined as a datum for axial reference (FIGS. 2A and 2B). The outer diameter and bore are then machined by a CNC or cam technique to desired profiles 22 and 24 respectively and which substantially correspond to the required unconstrained free-shape of the ring (FIGS. 3A and 3B). The outer diameter is then machined with a series of circumferential grooves 26 which correspond to the surface of each ring which is to be coated, in this case by chromium electro-plating (FIGS. 4A and 4B). Multiples of two machined tubes 10 are placed together in a jig (not shown) with their notches 18 in alignment for treatment and chromium plating by a known technique in known apparatus. The entire outer surface of the tube including the grooves 26 are coated with a desired thickness of chromium 28 (FIGS. 5A and 5B). The chromium coated surface 28 of the tube is now profile ground with a profiled grinding wheel 30 having recesses 32 corresponding to the desired ring profile (FIG. 6). Between each eventual ring blank 34 is a thickness of material 36 to allow for parting-off of the blanks 34 from the tube 10 (FIG. 7). Parting-off may be accomplished with a tool or elastic wheel 38 comprising, for example, cubic boron nitride (FIG. 8). The individual ring blanks are given a side face grinding operation to bring them within the desired tolerance after which a stack of individual ring blanks 34 are brought together for provision of the ring gap which is made by removing the piece of metal 40 by slitting wheels 42 (FIGS. 9 and 10).

I claim:

1. A method for the production of piston rings, the method comprising the steps of producing a tube of the material from which the rings are to be made, machining predetermined noncylindrical ring free shapes on the inner and outer diameters of the tube which substantially correspond to the required unconstrained free shape of the piston ring, cutting each individual ring from the tube so machined, and, at a point in the process subsequent to said machining, removing material corresponding to the ring gaps in finished unconstrained rings.

2. A method for the production of piston rings, the method comprising the steps of producing a tube of the material from which the rings are to be made, the tube having a longitudinal axis associated therewith, providing at least axial and radial datum registers in first machining steps of the tube, then by at least two subsequent machining steps, each employing a CNC technique and being in relation to the datum registers, providing substantially desired ring free shapes on the inner and outer surfaces of the tube, and then separating each at least substantially formed ring from the tube.

3. A method according to claim 2 wherein said first machining steps include providing two datum registers comprising either an end face of the tube and a bore, or a bore having an internal shoulder, and providing a machined datum feature on the tube end face for location and reference.

4. A method according to claim 3 in which, by at least one of said at least two subsequent machining steps, each cross section of each substantially formed ring is provided with a required non-linear radially outer profile.

5. A method according to claim 4 in which each cross section of each substantially formed ring is provided with a curved radially outer profile.

6. A method according to claim 4 in which a circumferential groove is provided in a radially outer surface of each substantially formed ring to receive a coating for the ring before separation from the tube.

7. A method according to claim 6 in which a ring coating is provided prior to the substantially formed ring being separated from the tube.

8. A method according to claim 3 in which a gap is provided for each ring after the substantially formed ring has been separated from the tube.

9. A method according to claim 3 in which a gap is provided for each ring before the substantially formed ring has been separated from the tube.

10. A method according to claim 2 in which the axial datum register is provided by machining a face on the tube to extend at right angles to said longitudinally extending axis.

11. A method according to claim 3 in which the machined datum feature is obtained by providing a tube end face with a machined feature spaced from said longitudinally extending axis.

12. A method for the production of piston rings, the method including producing a tube of the material from which the rings are to be made, and machining the outer surface and the bore of the tube to desired ring profiles wherein in first machining steps of the tube there are provided at least two datum registers comprising either an end face of the tube and a bore, or a bore having an internal shoulder, and a machined datum feature is provided on the tube end face for location and reference, all subsequent machining operations on the tube are calculated from these datum registers and datum feature and include machining the outer surface and the bore of the tube to desired profiles which substantially correspond to the required unconstrained free-shape of the rings, then providing ring cross-sectional profile features, and partially completed rings subsequently are separated from the tube.

13. A method according to claim 12 characterized in that said machined datum feature on the tube end face is spaced from the longitudinally extending axis of the tube.

14. A method according to claim 12 wherein a plurality of circumferential grooves to comprise a cross-sectional profile feature for each ring, each groove to receive a coating for the corresponding ring, are provided by machining the outer surface of the tube before separating the plurality of partially completed rings from the tube.

15. A method according to claim 12, wherein, before separating the plurality of partially completed rings from the tube, each partially completed ring is provided, by machining, with a required non-linear radially outer periphery to comprise a cross-sectional profile feature for the ring.

16. A method according to claim 12 wherein, before separating the plurality of partially completed rings from the tube, a ring coating is provided on the radially outer periphery of each partially completed ring to comprise a cross-sectional profile feature for the ring.

17. A method according to claim 12 wherein a gap is provided for each ring before the partially completed rings are separated from the tube.

18. A method according to claim 12 wherein a gap is provided for each ring after the partially completed rings are separated from the tube.

* * * * *

UNITED STATES PATENT AND TRADEMARK OFFICE
CERTIFICATE OF CORRECTION

PATENT NO. : 5,461,776
DATED : October 31, 1995
INVENTOR(S) : GRAHAM R. WOOD

It is certified that error appears in the above—identified patent and that said Letters Patent is hereby corrected as shown below:

On title page, item [30], the foreign application priority data is corrected to read --Jan. 9, 1990  [GB]  United Kingdom ..............9000446.6--

Signed and Sealed this

Thirtieth Day of January, 1996

Attest:

BRUCE LEHMAN

Attesting Officer

Commissioner of Patents and Trademarks